W. H. NORTH.
COLLAR PROTECTOR.
APPLICATION FILED JULY 12, 1918.
1,388,056.
Patented Aug. 16, 1921.
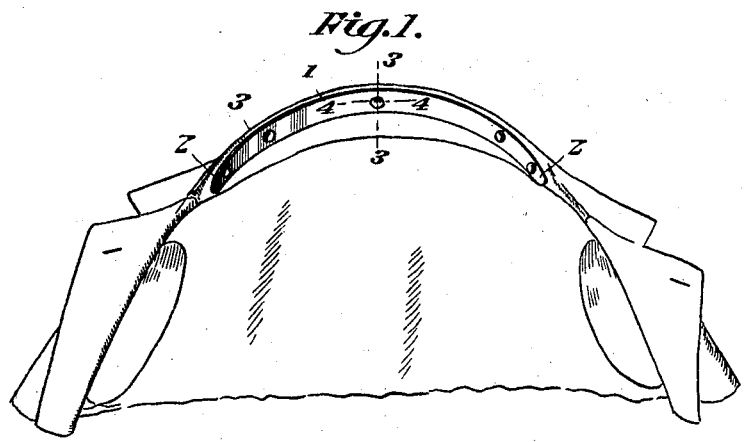
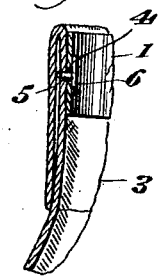
Witnesses
Inventor
William H. North
By Victor J. Evans
Attorney

UNITED STATES PATENT OFFICE.

WILLIAM HAMILTON NORTH, OF CAMBRIDGE, MARYLAND.

COLLAR-PROTECTOR.

1,388,056.  Specification of Letters Patent.  Patented Aug. 16, 1921.

Application filed July 12, 1918. Serial No. 244,595.

*To all whom it may concern:*

Be it known that I, WILLIAM H. NORTH, a citizen of the United States, residing at Cambridge, in the county of Dorchester and State of Maryland, have invented new and useful Improvements in Collar-Protectors, of which the following is a specification.

This invention relates to a collar protector.

The object of the invention is the provision of a strip of suitable material having means whereby the same may be easily and quickly attached to a coat, inward of the collar thereof to prevent a coat collar contacting with a linen collar and soiling the same.

A further object of the invention is to produce a device of this character which shall be of an extremely simple construction, which may be cheaply manufactured, easily attached or detached, and which will perform its functions with surety.

I accomplish the foregoing objects and others by a construction, a satisfactory exemplification of which is illustrated by the drawings, in which, Figure 1 is a view of the upper portion of a coat with the improvement applied thereto.

Fig. 2 is a perspective view of the improvement.

Fig. 3 is a sectional view approximately on the line 4—4 of Fig. 1.

My improved collar protector is constructed from a single strip 1 of suitable material, such as celluloid, the same being of a strength and resiliency sufficient not only to protect a linen collar but also to hold the coat collar in proper shape. The strip 1 has both its upper and lower edges, from its center parallel and approximately straight for a determined distance and from thence the said edges are gradually rounded downward. These downwardly rounded ends are indicated by the numeral 2, and the shape of the strip is such that it conforms to the shape of the upper portion of the coat 3, at the collar line thereof. The strip is centrally provided with a round opening 4 and through this opening is adapted to be passed the bifurcated shank 5 of a headed member 6, the head of the said member contacting with the inner face of the strip 1. The shank 5 is preferably constructed of spring wire, the size of which being comparatively small so that the same will inflict no injury to the coat when the same is passed therethrough, the prongs of the shank being hidden by the collar of the coat. In a like manner bifurcated shanks of similar headed members may be passed through round openings 7 and 8, arranged in spaced relation to the opposite side of the central opening, but if desired, and as illustrated in Fig. 5 of the drawings, the said strip may be slotted as at 9 in one direction from the last mentioned openings 7 and 8 so that in reality the strip is provided at its downturned ends and medially between its said ends and its center with buttonhole openings, and these buttonhole openings are engaged with buttons which are stitched to the coat 3. The strip is held, by securing means against movement in any direction on the coat, and it is believed, from the foregoing that the simplicity and advantages of the construction will be apparent.

Having thus described the invention, what I claim is:

In combination with the collar of a coat, of a combined stiffening member for said coat collar and a protector member for a coat collar that is normally contacted by the linen collar, said protector comprising a strip of celluloid having both its upper and lower edges from its center parallel for a determined distance and having its said edges from thence gradually rounded downwardly to the ends of the strip and the said ends being of a less width than the remainder of the said strip, and bendable prongs carried by the strip for removably securing the strip to a coat collar.

In testimony whereof I affix my signature.

WILLIAM HAMILTON NORTH.